US012799284B2

(12) United States Patent
Kim et al.

(10) Patent No.: US 12,799,284 B2
(45) Date of Patent: Nov. 17, 2026

(54) PREPARATION METHOD OF SUPER ABSORBENT POLYMER

(71) Applicant: LG Chem, Ltd., Seoul (KR)

(72) Inventors: Minsu Kim, Daejeon (KR); Chang Hun Han, Daejeon (KR); Tae Young Won, Daejeon (KR); Jungmin Sohn, Daejeon (KR); Junwye Lee, Daejeon (KR); Jihye Ryu, Daejeon (KR)

(73) Assignee: LG Chem, Ltd., Seoul (KR)

( * ) Notice: Subject to any disclaimer, the term of this patent is extended or adjusted under 35 U.S.C. 154(b) by 429 days.

(21) Appl. No.: 18/706,839

(22) PCT Filed: Dec. 14, 2022

(86) PCT No.: PCT/KR2022/020319

§ 371 (c)(1),
(2) Date: May 2, 2024

(87) PCT Pub. No.: WO2023/136481

PCT Pub. Date: Jul. 20, 2023

(65) Prior Publication Data

US 2025/0011550 A1 Jan. 9, 2025

(30) Foreign Application Priority Data

Jan. 11, 2022 (KR) ........................ 10-2022-0004042
Dec. 13, 2022 (KR) ........................ 10-2022-0174059

(51) Int. Cl.

*C08J 3/075* (2006.01)
*C08J 3/12* (2006.01)
*C08J 3/24* (2006.01)
*C08J 9/08* (2006.01)

(52) U.S. Cl.

CPC .............. *C08J 3/075* (2013.01); *C08J 3/122* (2013.01); *C08J 3/245* (2013.01); *C08J 9/08* (2013.01); *C08J 2203/02* (2013.01); *C08J 2205/022* (2013.01); *C08J 2333/02* (2013.01)

(58) Field of Classification Search

CPC ... C08J 3/075; C08J 3/122; C08J 3/245; C08J 9/08; C08J 2203/02; C08J 2205/022; C08J 2333/02; C08J 3/24; C08J 3/12; C08F 2/02; C08F 2/50; C08F 2/10; C08F 220/06; C08F 222/102

See application file for complete search history.

(56) References Cited

U.S. PATENT DOCUMENTS

2006/0252913 A1 11/2006 Herfert et al.
2008/0227933 A1 9/2008 Funk et al.
2011/0095227 A1 4/2011 Herth et al.
2012/0232176 A1 9/2012 Lopez Villanueva et al.
2016/0280862 A1 9/2016 Kim et al.
2017/0066862 A1* 3/2017 Matsumoto ........... C08F 220/06
2020/0188876 A1 6/2020 Kim et al.
2021/0023529 A1 1/2021 Lee et al.
2021/0069674 A1 3/2021 Jung et al.
2024/0124671 A1 4/2024 Kim et al.

FOREIGN PATENT DOCUMENTS

CN 113372611 A 9/2021
EP 0409136 A2 1/1991
EP 3159359 A1 4/2017
EP 3650491 A1 5/2020
EP 3708606 A1 9/2020
EP 3747938 A1 12/2020
JP H10114801 A 5/1998
JP H11-302310 A 11/1999
JP 2000-038407 A 2/2000
JP 2009507096 A 2/2009
KR 101448225 B1 10/2014
KR 101461174 B1 11/2014
KR 20160128350 A 11/2016
KR 20170002469 A 1/2017
KR 101812895 B1 12/2017
KR 20180003815 A 1/2018
KR 20190072298 A 6/2019
KR 20200071032 A 6/2020
KR 20210037450 A * 4/2021 ............. C08J 3/246
WO 2004085496 A1 10/2004
WO 2015163507 A1 10/2015
WO WO-2015199363 A1 * 12/2015 ............. C08F 10/02
WO 2023-120907 A1 6/2023

OTHER PUBLICATIONS

International Search Report for PCT/KR2022/020319 mailed Mar. 24, 2023. 3 pages.
Odian, G. “Principles of Polymerization” Dec. 1981, p. 203, Wiley Interscience Publication. (3 pgs.).
Schwalm, R. “UV Coatings Basics, Recent Developments and New Application,” Elsevier Science, Dec. 21, 2006, p. 115. (3 pgs.).
Extended European Search Report including Written Opinion for Application No. 22920810.3 dated Jan. 14, 2025. 8 pages.
Third Party of Observation dated May 10, 2024 for Application No. PCT/KR2022/020319. 9 pgs.

* cited by examiner

*Primary Examiner* — K. Boyle
(74) *Attorney, Agent, or Firm* — Lerner David LLP

(57) ABSTRACT

Provided is a preparation method of a super absorbent polymer. More specifically, it relates to a method for preparing a super absorbent polymer in which absorption properties of the finally prepared super absorbent polymer are improved by adjusting the timing of adding a reducing agent in the step of forming a hydrogel polymer through foam polymerization.

12 Claims, No Drawings

PREPARATION METHOD OF SUPER ABSORBENT POLYMER

CROSS-REFERENCED TO RELATED APPLICATIONS

The present application is a national stage entry under 35 U.S.C. § 371 of International Application No. PCT/KR2022/020319 filed on Dec. 14, 2022, which claims priority from Korean Patent Application Nos. 10-2022-0004042 and 10-2022-0174059, filed on Jan. 11, 2022 and Dec. 13, 2022, respectively.

TECHNICAL FIELD

The present disclosure relates to a preparation method of a super absorbent polymer. More specifically, it relates to a preparation method of a super absorbent polymer in which absorption properties of the finally prepared super absorbent polymer are improved by adjusting the timing of adding a reducing agent in the step of forming a hydrogel polymer through foam polymerization.

BACKGROUND OF ART

A super absorbent polymer (SAP) is a type of synthetic polymeric material capable of absorbing 500 to 1000 times its own weight of moisture. Various manufacturers have denominated it with different names, such as SAM (Super Absorbency Material), AGM (Absorbent Gel Material), and the like. Such super absorbent polymers started to be practically applied in sanitary products, and they are now being widely used not only for hygiene products, but also for water retaining soil products for gardening, water stop materials for the civil engineering and construction, sheets for raising seedling, fresh-keeping agents for food distribution fields, materials for poultices, or the like.

These super absorbent polymers have been widely used in the field of hygienic materials such as diapers or sanitary napkins. In such hygienic materials, the super absorbent polymer is generally contained in a state of being spread in the pulp. In recent years, however, continuous efforts have been made to provide hygienic materials such as diapers having a thinner thickness. As a part of such efforts, the development of so-called pulpless diapers and the like in which the pulp content is reduced, or pulp is not used at all is being actively advanced.

In the case of the above-described hygienic materials in which the pulp content is reduced or pulp is not used, the super absorbent polymer is included in a relatively high ratio, so that the super absorbent polymer particles are inevitably included in multiple layers in the hygienic materials. In order for the entire super absorbent polymer particles included in multiple layers to more efficiently absorb a large amount of liquid such as urine, the super absorbent polymer basically needs to exhibit excellent absorption performance as well as a high absorption rate.

Accordingly, a process using a foaming agent is known to improve the physical properties of the super absorbent polymer such as absorption performance and absorption rate. However, $CO_2$ generated by the foaming agent cannot be effectively captured and is lost during the polymerization process, resulting in a decrease in foaming efficiency.

In order to increase the foaming efficiency, the content of the foaming agent was increased, but there was a problem in that it was difficult to achieve the desired level of $CO_2$ capturing efficiency compared to the amount used. Accordingly, there is a need for research to improve the efficiency of using the foaming agent to realize the desired excellent absorption performance.

Technical Problem

Accordingly, the present disclosure relates to a preparation method of a super absorbent polymer in which absorption properties of the finally prepared super absorbent polymer are improved by adjusting the timing of adding a reducing agent in the step of forming a hydrogel polymer through foam polymerization, thereby accelerating the gelation of the hydrogel polymer to minimize the $CO_2$ loss generated in the foam polymerization step.

Technical Solution

In order to solve the above problems, there is provided a preparation method of a super absorbent polymer, including the steps of: preparing a monomer composition by mixing an acrylic acid-based monomer having at least partially neutralized acidic groups, an internal cross-linking agent, a foaming agent, a thermal polymerization initiator, and a photopolymerization initiator; forming a hydrogel polymer by irradiating light while adding a reducing agent into the monomer composition; drying, pulverizing, and classifying the hydrogel polymer to form a base resin powder; and cross-linking the surface of the base resin powder by performing heat treatment on the base resin powder in the presence of a surface cross-linking agent.

Advantageous Effects

According to the preparation method of a super absorbent polymer of the present disclosure, a super absorbent polymer that finally achieves excellent absorbent properties can be prepared by adjusting the timing of adding a reducing agent in the step of forming a hydrogel polymer through foam polymerization, thereby accelerating the gelation of the hydrogel polymer to minimize the $CO_2$ loss generated in the foam polymerization step.

DETAILED DESCRIPTION

The terminology used herein is for the purpose of describing particular embodiments only and is not intended to limit the invention.

The singular forms are intended to include the plural forms as well, unless the context clearly indicates otherwise. It will be further understood that the terms "include", "have", or "possess" when used in this specification, specify the presence of stated features, steps, components, or combinations thereof, but do not preclude the presence or addition of one or more other features, steps, components, or combinations thereof.

The terms "the first", "the second", "the third" and the like are used to describe a variety of components, and these terms are merely employed to distinguish a certain component from other components.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

The terminology "polymer" in the present disclosure is in a state in which an acrylic acid-based monomer is polymerized, and may include all moisture content ranges, or all particle diameter ranges. Among the polymers, a polymer having a moisture content of about 40 wt % or more after polymerization and before drying may be referred to as a hydrogel polymer, and particles in which the hydrogel polymer is pulverized and dried may be referred to as a cross-linked polymer.

In addition, the terminology "super absorbent polymer powder" refers to a particulate material containing a cross-linked polymer in which an acrylic acid-based monomer having at least partially neutralized acidic groups is polymerized and cross-linked by an internal cross-linking agent.

In addition, the terminology "super absorbent polymer" is used to encompass all of a cross-linked polymer in which an acrylic acid-based monomer having at least partially neutralized acidic groups is polymerized or a base resin in the form of powder consisting of super absorbent polymer particles in which the cross-linked polymer is pulverized, and the cross-linked polymer or the base resin further processed, for example, surface cross-linking, fine reassembling, drying, pulverization, classification, etc., to be in a state suitable for commercialization, depending on the context.

In addition, the terminology "cross-linked polymer" means that the acrylic acid-based monomer is cross-link polymerized in the presence of an internal cross-linking agent, and the "base resin particle (powder)" refers to a particulate (powder) material containing such a cross-linked polymer.

The preparation method of a super absorbent polymer according to one embodiment of the present disclosure includes the steps of: preparing a monomer composition by mixing an acrylic acid-based monomer having at least partially neutralized acidic groups, an internal cross-linking agent, a foaming agent, a thermal polymerization initiator, and a photopolymerization initiator; forming a hydrogel polymer by irradiating light while adding a reducing agent into the monomer composition; drying, pulverizing, and classifying the hydrogel polymer to form a base resin powder; and cross-linking the surface of the base resin powder by performing heat treatment on the base resin powder in the presence of a surface cross-linking agent.

Conventionally, a process of using a foaming agent to improve physical properties such as absorption capacity or absorption rate of the super absorbent polymer is known, but there is a problem in that $CO_2$ generated by the foaming agent cannot be effectively captured and is lost during the polymerization process, resulting in a decrease in foaming efficiency.

In particular, an increased amount of the foaming agent was used in order to increase the foaming efficiency. Even in this case, $CO_2$ generated by the foaming agent was lost before gelation of the polymer, making it difficult to achieve the desired $CO_2$ capturing efficiency compared to the amount used.

Accordingly, the present inventors have confirmed that the $CO_2$ loss generated in the foam polymerization step can be minimized by controlling the timing of adding a reducing agent in the step of forming the hydrogel polymer through foam polymerization, thereby accelerating the gelation of the hydrogel polymer. Then, they completed the present disclosure.

The super absorbent polymer prepared according to the present disclosure can have excellent absorption properties, particularly excellent effective absorption capacity and high absorption rate.

Hereinafter, each step of the preparation method of a super absorbent polymer according to one embodiment of the present disclosure will be described in more detail.

(Preparation Step of Monomer Composition)

The preparation method of a super absorbent polymer according to one embodiment of the present disclosure includes the steps of: preparing a monomer composition by mixing an acrylic acid-based monomer having at least partially neutralized acidic groups, an internal cross-linking agent, a foaming agent, a thermal polymerization initiator, and a photopolymerization initiator; and forming a hydrogel polymer by irradiating light while adding a reducing agent into the monomer composition.

The step of forming the polymer is a step of forming a hydrogel polymer by foam polymerization of the monomer composition in the presence of a foaming agent and an internal cross-linking agent. In the above step, the surface area is increased by forming pores in the hydrogel polymer by $CO_2$ generated by the foaming agent, and thus excellent absorbent properties are achieved. In addition, in the above step, an appropriate cross-linking density of the hydrogel polymer can be achieved by an internal cross-linking agent, thereby realizing an appropriate strength of the hydrogel polymer.

In particular, when performing light irradiation while adding a reducing agent to the monomer composition, the gelation rate by the reducing agent is accelerated, and $CO_2$ generated by the foaming agent is effectively captured in the hydrogel polymer, so that excellent absorption properties can be realized.

First, a monomer composition is prepared by mixing an acrylic acid-based monomer having at least partially neutralized acidic groups, an internal cross-linking agent, a foaming agent, and a photopolymerization initiator.

The acrylic acid-based monomer may be any monomer commonly used in the preparation of a super absorbent polymer. As a non-limiting example, the acrylic acid-based monomer may be a compound represented by the following Chemical Formula 1:

$$R_1\text{—COOM}^1 \qquad \text{[Chemical Formula 1]}$$

in Chemical Formula 1, $R_1$ is a C2 to C5 alkyl group having an unsaturated bond, and $M^1$ is a hydrogen atom, a monovalent or divalent metal, an ammonium group, or an organic amine salt.

Preferably, the acrylic acid-based monomer may be at least one selected from the group consisting of acrylic acid, methacrylic acid, and a monovalent metal salt, a divalent metal salt, an ammonium salt and an organic amine salt thereof. Using the acrylic acid-based monomer is advantageous for obtaining a super absorbent polymer having improved absorption performance. In addition, at least one selected from the group consisting of an anionic monomer of maleic anhydride, fumalic acid, crotonic acid, itaconic acid, 2-acryloylethane sulfonic acid, 2-methacryloylethane sulfonic acid, 2-(meth)acryloylpropanesulfonic acid, and 2-(meth)acrylamide-2-methyl propanesulfonic acid and a salt thereof; a nonionic hydrophilic monomer of (meth) acrylamide, N-substituted (meth)acrylate, 2-hydroxyethyl (meth)acrylate, 2-hydroxypropyl(meth)acrylate, methoxy-polyethyleneglycol(meth)acrylate, and polyethyleneglycol (meth)acrylate; and an amino-containing unsaturated monomer of (N,N)-dimethylaminoethyl(meth)acrylate and (N,N)-dimethylaminopropyl(meth)acrylamide, and a quaternary compound thereof may be used.

Herein, the acrylic acid-based monomer may have acidic groups, and at least some of the acidic groups is neutralized using a neutralization solution. Preferably, the monomers may be partially neutralized with an alkali substance such as sodium hydroxide, potassium hydroxide, ammonium hydroxide or the like.

Herein, a degree of neutralization of the monomer may be 65 to 75 mol %, or 60 to 70 mol %. A range of the degree of neutralization may vary depending on the final physical properties. An excessively high degree of neutralization causes the neutralized monomers to be precipitated, and thus polymerization may not readily occur. On the contrary, an excessively low degree of neutralization not only deteriorates absorbency of the polymer, but also gives the polymer hard-to-handle properties, such as those of an elastic rubber.

In addition, the terminology "internal cross-linking agent" used herein is different from "a surface cross-linking agent" for cross-linking the surface of the base resin, and the internal cross-linking agent polymerizes unsaturated bonds of the acrylic acid-based monomer by cross-linking. The cross-linking in the above step proceeds both on the surface and on the inside, but when the surface cross-linking process of the base resin to be described later is in progress, the surface of the particles of the finally prepared super absorbent polymer has a structure cross-linked by a surface cross-linking agent, and the inside of the particles has a structure cross-linked by the internal cross-linking agent.

As the internal cross-linking agent, a multifunctional cross-linking agent may be used. For example, at least one selected from the group consisting of N,N'-methylenebisacrylamide, trimethylpropane tri(meth)acrylate, ethylene glycol di(meth)acrylate, polyethylene glycol (meth)acrylate, propylene glycol di(meth)acrylate, polypropylene glycol (meth)acrylate, butanediol di(meth)acrylate, butylene glycol di(meth)acrylate, diethylene glycol di(meth)acrylate, hexanediol di(meth)acrylate, triethylene glycol di(meth) acrylate, tripropylene glycol di(meth)acrylate, tetraethylene glycol di(meth)acrylate, dipentaerythritol pentaacrylate, glycerin tri(meth)acrylate, pentaerythritol tetraacrylate, triarylamine, ethylene glycol diglycidyl ether, propylene glycol, glycerin, and ethylene carbonate may be used. Preferably, propylene glycol di(meth)acrylate may be used.

The internal cross-linking agent may be used in an amount of 100 ppmw to 10,000 ppmw based on the total weight of the acrylic acid-based monomer. When included within the above range, it is possible to realize a strength above an appropriate level through sufficient cross-linking, and sufficient water retention capacity can be realized by the introduction of an appropriate cross-linked structure. Preferably, it may be included in an amount of 100 ppmw or more, 200 ppmw or more, 300 ppmw or more, or 600 ppmw or more, and 10,000 ppmw or less, 9,000 ppmw or less, 7,000 ppmw or less or 5,000 ppmw or less, which is in the range of 200 ppmw to 9,000 ppmw, 300 ppmw to 7,000 ppmw, or 600 ppmw to 6,000 ppmw. When the content of the internal cross-linking agent is too low, cross-linking does not occur sufficiently, making it difficult to realize a strength above an appropriate level. When the content of the internal cross-linking agent is too high, the internal cross-linking density increases, making it difficult to realize a desired water retention capacity.

The foaming agent is a component that reacts with the acrylic acid-based monomer in the monomer composition to generate $CO_2$, thereby forming appropriate pores in the hydrogel polymer to increase the surface area of the hydrogel polymer, and thus it can improve absorption properties of the polymer. Specifically, as will be described later, gelation is promoted by a reducing agent added simultaneously with light irradiation, so that $CO_2$ generated by the foaming agent can be effectively captured. Accordingly, even with a relatively small amount of the foaming agent, it is possible to realize an excellent $CO_2$ capturing effect.

As the foaming agent, carbonate may be used. For example, sodium bicarbonate, sodium carbonate, potassium bicarbonate, potassium carbonate, calcium bicarbonate, calcium carbonate, magnesium bicarbonate, or magnesium carbonate may be used. Preferably, sodium bicarbonate may be used.

The foaming agent may be included in an amount of 500 ppmw to 3,000 ppmw based on the weight of the acrylic acid-based monomer, and $CO_2$ can be effectively captured by a reducing agent to be described later even with a relatively small amount of the foaming agent. Preferably, the foaming agent may be included in an amount of 500 ppmw or more, 800 ppmw or more, 1,000 ppmw or more, or 1,500 ppmw or more, and 3,000 ppmw or less, 2,500 ppmw or less, or 2,000 ppmw or less, which is in the range of 800 ppmw to 2,500 ppmw, or 1,000 ppmw to 2,000 ppmw. When the content of the foaming agent is too low, the amount of $CO_2$ generated is small, and the desired effect of improving absorption properties is insignificant. When the content of the foaming agent is too high, too many pores are formed, resulting in a decrease in gel strength of the super absorbent polymer, a decrease in absorption capacity which is the ability to absorb, and a decrease in density, which may cause problems in distribution and storage. In particular, the amount of fine particles may increase in the pulverization process.

For example, the photopolymerization initiator may be one or more compounds selected from the group consisting of benzoin ether, dialkyl acetophenone, hydroxyl alkylketone, phenyl glyoxylate, benzyl dimethyl ketal, acyl phosphine, and $\alpha$-aminoketone. Specific examples of acylphosphine include diphenyl(2,4,6-trimethylbenzoyl)phosphine oxide, phenylbis(2,4,6-trimethylbenzoyl)phosphine oxide, ethyl(2,4,6-trimethylbenzoyl)phenylphosphinate, and the like. More various photopolymerization initiators are well disclosed in "UV Coatings: Basics, Recent Developments and New Application (Elsevier, 2007)" written by Reinhold Schwalm, p 115, and the present disclosure is not limited thereto. Preferably, acyl phosphine may be used.

The photopolymerization initiator may be added in an amount of 50 ppmw to 10,000 ppmw, preferably 50 ppmw to 5,000 ppmw, or 100 ppmw to 3,000 ppmw based on the weight of the acrylic acid-based monomer. When the concentration of the photopolymerization initiator is excessively low, the polymerization rate may become slow, and a large amount of residual monomers may be extracted from the final product. Conversely, when the concentration of the photopolymerization initiator is excessively high, polymer chains forming a network are shortened, so that the extractable content increases and absorbency under pressure decreases, thereby lowering physical properties of the polymer.

Furthermore, as the thermal polymerization initiator, one or more initiators selected from the group consisting of a persulfate-based initiator, an azo-based initiator, hydrogen peroxide, and ascorbic acid may be used. Specifically, sodium persulfate ($Na_2S_2O_8$), potassium persulfate ($K_2S_2O_8$), ammonium persulfate ($(NH_4)_2S_2O_8$), and the like may be used as examples of the persulfate-based initiator. In addition, 2,2-azobis(2-amidinopropane) dihydrochloride, 2,2-azobis-(N,N-dimethylene)isobutyramidine dihydrochloride, 2-(carbamoylazo)isobutylonitril, 2,2-azobis[2-(2-imidazolin-2-yl)propane] dihydrochloride, 4,4-azobis-(4-cyanovaleric acid), and the like may be used as examples of the azo-based initiator. More various thermal polymerization initiators are well disclosed in "Principle of Polymerization (Wiley, 1981)" written by Odian, p 203. Preferably, a persulfate-based initiator may be used.

The thermal polymerization initiator may be added in an amount of 50 ppmw to 5,000 ppmw, preferably 100 ppmw to 3,000 ppmw, or 500 ppmw to 2,500 ppmw based on the weight of the acrylic acid-based monomer. When the concentration of the thermal polymerization initiator is excessively low, the polymerization rate may become slow, and a large amount of residual monomers may be extracted from the final product. Conversely, when the concentration of the polymerization initiator is excessively high, polymer chains forming a network are shortened, so that the extractable content increases and absorbency under pressure decreases, thereby lowering physical properties of the polymer.

In addition, the monomer composition may further include a thickener, a plasticizer, a preservation stabilizer, a surfactant, an antioxidant, or the like, if necessary.

The surfactant induces uniform dispersion of the foaming agent to enable uniform foaming, thereby preventing lowering of gel strength or lowering of density. As the surfactant, it is preferable to use an anionic surfactant. Specifically, the surfactant contains an $SO_3^-$ anion, and a compound represented by the following Chemical Formula 2 may be used.

$R—SO_3Na$ [Chemical Formula 2]

in Chemical Formula 2,

R is C8 to 16 alkyl.

In addition, it is preferable to use the surfactant in an amount of 300 ppmw or less based on the weight of the acrylic acid-based monomer. When the amount of the surfactant exceeds 300 ppmw, the content of the surfactant in the super absorbent polymer increases, which is not preferable. In addition, the surfactant is preferably used in an amount of 100 ppmw or more, or 150 ppmw or more, based on the weight of the water-soluble ethylene-based unsaturated monomer.

In addition, such a monomer composition may be prepared in the form of a solution in which raw materials such as the above-described monomer, foaming agent, and initiator are dissolved in a solvent.

At this time, any solvent which can dissolve the raw materials may be used without limitation, and for example, water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butyrolactone, carbitol, methylcellosolve acetate, N,N-dimethylacetamide, or a mixture thereof can be used.

(Polymerization Step)

The preparation method of a super absorbent polymer according to one embodiment of the present disclosure includes the step of forming a hydrogel polymer by irradiating light while adding a reducing agent into the monomer composition including the above-described components.

When the reducing agent was not used in the prior art, $CO_2$ generated in the foam polymerization was easily lost, so that there was a problem in that a sufficient capturing effect could not be achieved to a desired level.

As the present disclosure performs light irradiation while adding a reducing agent to the monomer composition, the gelation rate by the reducing agent is accelerated, and $CO_2$ generated by the foaming agent is effectively captured in the hydrogel polymer, so that excellent absorption properties can be realized.

Specifically, the step of forming the hydrogel polymer by polymerizing the monomer composition is performed by photopolymerization, and a reducing agent is simultaneously added at the time of light irradiation in the photopolymerization.

As a non-limiting example, the polymerization may proceed in a reactor equipped with a movable conveyor belt. For example, when the monomer composition is discharged onto a belt in the reactor equipped with a movable conveyor belt, a separate light source may be disposed on the belt so that light irradiation can be performed. At this time, the reducing agent is added when the monomer composition is discharged onto the belt. The reducing agent is added in a manner in which the reducing agent is evenly sprayed to the monomer composition. For example, when the monomer composition is discharged from the conveyor belt, the reducing agent may be added by a method of evenly spraying the reducing agent to the monomer composition through a predetermined dispenser provided in the reactor.

Meanwhile, when the reducing agent is first included in the monomer composition rather than added simultaneously with light irradiation, the polymerization reaction of the monomer is initiated before photopolymerization is initiated by a redox reaction between the reducing agent and the thermal polymerization initiator in the composition. Accordingly, some polymers are formed in the monomer composition, which may make it difficult to discharge the monomer composition for subsequent light irradiation polymerization.

When photopolymerization is performed on the monomer composition in the reactor equipped with a movable conveyor belt as described above, a hydrogel polymer in the form of a sheet may usually be obtained. At this time, a thickness of the sheet may vary depending on the concentration and injection rate of the monomer composition to be injected. In order to ensure the production rate while allowing the entire sheet to be polymerized evenly, it is preferable to adjust the thickness to 0.5 to 10 cm.

The reducing agent may be at least one selected from the group consisting of sodium sulfite, potassium sulfite, ammonium sulfite, sodium hydrogen sulfite, potassium hydrogen sulfite, ammonium hydrogen sulfite, sodium metabisulfite, potassium metabisulfite, formic acid, oxalic acid, hydrogen peroxide, and ascorbic acid. Preferably, potassium metabisulfite, sodium metabisulfite, or ascorbic acid may be used.

The reducing agent may be included in an amount of 100 ppmw to 3,000 ppmw based on the weight of the acrylic acid-based monomer, and is included within the above range to effectively capture $CO_2$. Preferably, it may be included in 100 ppmw to 2,500 ppmw, 200 ppmw to 2,000 ppmw, or 300 ppmw to 1,000 ppmw. When the content of the reducing agent is too low, the $CO_2$ capturing efficiency is lowered, and it is difficult to achieve a desired absorption rate. When the content of the reducing agent is too high, a large amount of thermal polymerization initiator may be exhausted and a large amount of residual monomer may be present.

Generally, the moisture content of the hydrogel polymer obtained by the above method may be about 40 to about 80 wt %. At this time, "moisture content" in the present disclosure is the content of moisture in the entire weight of the hydrogel polymer, and it means a value of which the weight of the dried polymer is subtracted from the weight of the hydrogel polymer. Specifically, the moisture content is defined as a value calculated by measuring the weight loss due to moisture evaporation from the polymer in the process of increasing the temperature of the polymer for drying through infrared heating. At this time, the drying condition for measuring the moisture content is as follows: the temperature is increased to about 180 °C and maintained at 180 °C, and the total drying time is 20 minutes including 5 minutes of a heating step.

(Drying, Pulverizing, and Classifying Steps)

Subsequently, a step of forming a base resin by drying, pulverizing, and classifying the hydrogel polymer is included.

Specifically, a step of drying the obtained hydrogel polymer is performed. If necessary, a step of coarsely pulverizing the hydrogel polymer may be further performed before drying to increase an efficiency of the drying step.

At this time, there is no limitation in the configuration of the pulverizing machine. Specifically, at least one pulverizing machine selected from the group consisting of a vertical pulverizer, a turbo cutter, a turbo grinder, a rotary cutter mill, a cutter mill, a disc mill, a shred crusher, a crusher, a chopper and a disc cutter may be used, but the present disclosure is not limited thereto.

Herein, the hydrogel polymer may be coarsely pulverized so that the particle diameter is about 2 to about 10 mm. Pulverization to a particle diameter of less than 2 mm is not technically easy due to the high moisture content of the hydrogel polymer, and a phenomenon of agglomeration between the pulverized particles may occur. On the other hand, when pulverized to a particle diameter of more than 10 mm, an increase in efficiency of the subsequent drying step may be insignificant.

Drying is performed on the hydrogel polymer that has been coarsely pulverized as described above or immediately after polymerization without the coarse pulverization step. The drying temperature in the drying step may be about 150 to about 250 °C. When the drying temperature is less than 150 °C, the drying time may become excessively long and physical properties of the super absorbent polymer to be finally formed may decrease. When the drying temperature is more than 250 °C, only the surface of the polymer is excessively dried, fine powder may be generated in the subsequent pulverization process, and physical properties of the final super absorbent polymer may decrease. Therefore, the drying may preferably be performed at a temperature of about 150 to about 200 °C, more preferably at a temperature of about 170 to about 195 °C.

Meanwhile, the drying time may be about 20 minutes to about 90 minutes in consideration of process efficiency, but is not limited thereto.

The drying method in the drying step is not particularly limited if it has been generally used in the drying process of the hydrogel polymer. Specifically, the drying step may be performed by the method of hot air provision, infrared radiation, microwave radiation, UV ray radiation, and the like. After the drying step, the moisture content of the polymer may be about 0.1 to about 10 wt %.

Subsequently, a step of pulverizing the dried polymer obtained through the drying step is performed.

The polymer powder obtained after the pulverization step may have a particle diameter of about 150 to about 850 μm. As the pulverizing machine used for pulverization to such a particle diameter, a pin mill, a hammer mill, a screw mill, a roll mill, a disc mill, a jog mill, or the like may be used, but the present disclosure is not limited thereto.

Further, in order to manage the physical properties of the super absorbent polymer particles to be commercialized after the pulverization step, the polymer particles obtained after pulverization is classified according to particle size. Preferably, the polymer having a particle diameter of about 150 to about 850 μm is classified, and only the polymer particles having such a particle diameter can be commercialized after a surface cross-linking reaction step. More specifically, the classified base resin may have a particle diameter of 150 to 850 μm, and may include particles having a particle diameter of 300 to 600 μm in an amount of 50 wt % or more.

(Surface Cross-Linking Step)

Subsequently, the preparation method of a super absorbent polymer according to one embodiment of the present disclosure further includes a step of cross-linking a part of the surface of the base resin by performing heat treatment on the base resin in the presence of a surface cross-linking agent.

The surface cross-linking step is to induce a cross-linking reaction on the surface of the base resin in the presence of a surface cross-linking agent, and unsaturated bonds of the acrylic acid-based monomer remaining on the surface without being cross-linked are cross-linked by the surface cross-linking agent, thereby forming a super absorbent polymer with high surface cross-linking density.

Specifically, a surface cross-linked layer may be formed by a heat-treatment process in the presence of a surface cross-linking agent. The heat-treatment process increases the surface cross-linking density, that is, the external cross-linking density, but does not change the internal cross-linking density. Accordingly, the prepared super absorbent polymer having the surface cross-linked layer has a structure having higher cross-linking density on the outside than inside.

In the surface cross-linking step, a surface cross-linking agent composition containing an alcohol-based solvent and water in addition to the surface cross-linking agent may be used.

As the surface cross-linking agent included in the surface cross-linking agent composition, any cross-linking component that has been conventionally used in the preparation of a super absorbent polymer may be used without any particular limitation. Examples of the surface cross-linking agent may include at least one polyol selected from the group consisting of ethylene glycol, propylene glycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol and glycerol; at least one carbonate-based compound selected from the group consisting of ethylene carbonate, and propylene carbonate; an epoxy compound such as ethylene glycol diglycidyl ether; an oxazoline compound such as oxazolidinone; a polyamine compound; an oxazoline compound; a mono-, di- or poly-oxazolidinone compound; a cyclic urea compound; and the like. Preferably, the surface cross-linking agent may be the same as the internal cross-linking agent. For example, a diglycidyl ether-based compound of alkylene glycol such as ethylene glycol diglycidyl ether may be used.

The surface cross-linking agent may be used in an amount of 0.001 to 2 parts by weight based on 100 parts by weight of the base resin powder. Preferably, it may be used in an amount of 0.005 parts by weight or more, 0.01 parts by weight or more, or 0.02 parts by weight or more, and 0.5 parts by weight or less, or 0.3 parts by weight or less. When adjusting the content range of the surface cross-linking agent within the above-described range, a super absorbent polymer exhibiting various physical properties such as excellent absorption performance and permeability can be prepared.

Meanwhile, the surface cross-linking agent is added to the base resin in the form of a surface cross-linking agent composition containing the same, and the method of adding the surface cross-linking agent composition is not particularly limited. For example, a method of adding the surface cross-linking agent composition and the base resin in a reactor for mixing, a method of spraying the surface cross-linking agent composition onto the base resin, or a method of mixing the base resin and the surface cross-linking agent composition while continuously providing them to a continuously operating mixer may be used.

In addition, the surface cross-linking agent composition may further include water and/or a hydrophilic organic solvent as a medium. With this, there is an advantage that the surface cross-linking agent may be evenly dispersed on the based resin. At this time, amounts of water and a hydrophilic organic solvent to be added based on 100 parts by weight of the base resin may be properly controlled for the purposes of inducing a uniform dissolution/dispersion of the surface cross-linking agent, preventing an agglomeration phenomenon of the base resin, and optimizing a surface penetration depth of the surface cross-linking agent.

The surface cross-linking step may be performed by heat treatment at a temperature of 110 °C to 220 °C or 110 °C to 195 °C for 30 minutes or more. More specifically, the surface cross-linking reaction may be performed by heat treatment for to 80 minutes or 40 to 70 minutes at the maximum reaction temperature which is the above-mentioned temperature.

When satisfying these surface cross-linking process conditions (particularly, the temperature elevating condition and the reaction condition at maximum reaction temperature), a super absorbent polymer that appropriately satisfies physical properties such as better permeability under pressure can be produced.

The heating means for the surface cross-linking reaction is not particularly limited. It is possible to provide a thermal media thereto or provide a heat source directly thereto. At this time, usable thermal media may be a heated fluid such as steam, hot air, hot oil, and the like, but the present disclosure is not limited thereto. Furthermore, the temperature of the thermal media provided thereto may be properly selected in consideration of the means of the thermal media, heating speed, and target temperature of heating. Meanwhile, an electric heater or a gas heater may be used as the heat source provided directly, but the present disclosure is not limited thereto.

Meanwhile, in the preparation method of a super absorbent polymer according to one embodiment of the present disclosure, aluminum salts such as aluminum sulfate salts and other various polyvalent metal salts may be further used during surface cross-linking to further improve permeability. Such a polyvalent metal salt may be included on the surface cross-linked layer of the finally prepared super absorbent polymer.

(Super Absorbent Polymer)

The super absorbent polymer prepared according to the above-described embodiment may have a particle diameter of 150 to 850 μm. More specifically, at least 95 wt % of the super absorbent polymer has a particle diameter of 150 to 850 μm. Further, the super absorbent polymer has 50 wt % or more of particles having a particle diameter of 300 to 600 μm, and less than 3 wt % of fines having a particle diameter of less than 150 μm.

The super absorbent polymer prepared according to one embodiment has excellent absorbent properties, and in particular, exhibits excellent absorbent rate and effective absorption capacity.

The above-described super absorbent polymer may have a vortex time (absorption rate) by a vortex method of 60 seconds or less, 58 seconds or less, or 55 seconds or less at 24.0 °C. In addition, as the lower vortex time can be evaluated as the better, the lower limit is theoretically 0 seconds, but may be 5 seconds or more, 10 seconds or more, or 20 seconds or more. The method for measuring the vortex time of the super absorbent polymer will be described in more detail in the following experimental examples.

The super absorbent polymer may have an effective absorption capacity (EFFC) calculated by the Equation 1 of 26.5 g/g or more. Preferably, the effective absorption capacity may be 26.6 g/g or more, or 26.8 g/g or more.

$$\text{Effective absorption capacity } (EFFC) = \{CRC + 0.7\text{ psi } AUP\}/2 \quad \text{[Equation 1]}$$

wherein the CRC is centrifuge retention capacity (CRC) measured according to the EDANA WSP 241.3, and the method for measuring CRC will be described in more detail in the following experimental examples.

The 0.7 psi AUP is absorbency under pressure (AUP) at 0.7 psi measured according to the EDANA WSP 242.3, and the method for measuring 0.7 psi AUP will be described in more detail in the following experimental examples.

Hereinafter, the function and effect of the present disclosure will be described in more detail through specific examples. However, these examples are for illustrative purposes only, and the disclosure is not intended to be limited by these examples.

EXAMPLES AND COMPARATIVE EXAMPLES

<Preparation of Super Absorbent Polymer>

Example 1

(Step 1—Preparation of Monomer Composition)

In a 3 L glass container equipped with a stirrer and a thermometer, 430 g of acrylic acid, 1,100 ppmw (based on acrylic acid) of sodium bicarbonate as a foaming agent, 6,000 ppmw (based on acrylic acid) of propylene glycol di(meth)acrylate as an internal cross-linking agent, 100 ppmw (based on acrylic acid) of acylphosphine as a photopolymerization initiator, 2,000 ppmw (based on acrylic acid) of sodium persulfate as a thermal polymerization initiator and 600 g of 30 wt % NaOH aqueous solution were mixed at room temperature (25±1 °C) to prepare a monomer composition having a total solid content of 40 wt % (degree of neutralization of acrylic acid: 70 mol %).

(Step 2—Preparation of Hydrogel Polymer)

Thereafter, the monomer composition was supplied at 500 to 2000 mL/min on a conveyor belt in which a belt having a width of 10 cm and a length of 2 m was rotated at 50 cm/min. A reducing agent was added to the discharged monomer composition in a manner of uniformly spraying 400 ppmw (based on acrylic acid) of sodium metabisulfite to the discharged monomer composition using a predetermined dispenser in the outlet on the conveyor belt. In addition, polymerization was performed by light irradiation for 1 minute simultaneously with the supply of the monomer composition.

Thereafter, the hydrogel polymer was coarsely pulverized with a chopper having a hole size of 16 mm, and dried in an oven capable of changing wind direction up and down at 190 °C for 30 minutes.

Then, the dried product was put into a pin mill and pulverized, and then classified using a ASTM standard mesh to obtain an acrylic acid-based base resin powder having a particle diameter of 150 to 850 μm.

Thereafter, a surface cross-linking solution (ethylene carbonate 1.0 g, propylene glycol 0.8 g, and water 3.5 g) was sprayed on 100 g of the obtained base resin powder, and stirred at room temperature for 30 seconds at 300 rpm to evenly distribute the surface cross-linking solution on the base resin powder.

Subsequently, a surface cross-linking reaction was performed by adding the mixture including the surface cross-linking solution and the acrylic base resin powder to a surface cross-linking reactor. In this surface cross-linking reactor, it was confirmed that the temperature of the base resin powder gradually increased from an initial temperature of around 80 °C, and was controlled to reach the maximum reaction temperature of 195 °C after 30 minutes. After reaching the maximum reaction temperature, the reaction was further conducted for 20 minutes, and then a sample of the super absorbent polymer was finally prepared. After the surface cross-linking process, the super absorbent polymer was classified using a ASTM standard mesh to have a particle diameter of 150 μm to 850 μm.

Example 2

A super absorbent polymer was prepared in the same manner as in Example 1, except that the amount of the reducing agent was increased to 600 ppmw based on acrylic acid in the step 2 of Example 1.

Example 3

A super absorbent polymer was prepared in the same manner as in Example 1, except that the amount of the reducing agent was increased to 800 ppmw based on acrylic acid in the step 2 of Example 1.

Example 4

A super absorbent polymer was prepared in the same manner as in Example 1, except that 100 ppm (based on acrylic acid) of hydrogen peroxide ($H_2O_2$) was used as the reducing agent in the step 2 of Example 1.

Comparative Example 1

A super absorbent polymer was prepared in the same manner as in Example 1, except that the reducing agent was not used in the step 1 of Example 1.

Comparative Example 2

A super absorbent polymer was prepared in the same manner as in Comparative Example 1, except that the amount of the foaming agent was increased to 2,000 ppmw based on acrylic acid in Comparative Example 1.

Comparative Example 3

A super absorbent polymer was prepared in the same manner as in Example 1, except that the polymerization was completed without using a reducing agent in the step 1 of Example 1, 400 ppmw (based on acrylic acid) of sodium metabisulfite was mixed with the hydrogel polymer, and then a coarse pulverization process was performed in a chopper.

Experimental Examples

The physical properties of the super absorbent polymers prepared in Examples and Comparative Examples were evaluated in the following manner, and are shown in Table 1 below.

(1) Centrifuge Retention Capacity (CRC)

The super absorbent polymers having a particle diameter of 150 to 850 μm were taken from the super absorbent polymers prepared in the above Examples and Comparative Examples, and the centrifuge retention capacity (CRC) by absorption ratio under a non-loading condition was measured according to the EDANA (European Disposables and Nonwovens Association) WSP 241.2.

Specifically, classified polymers were obtained by classifying the super absorbent polymers obtained in Examples and Comparative Examples through a #30-50 sieve. After inserting W'0 (g, about 0.2 g) of the polymer uniformly in a nonwoven fabric envelope and sealing the same, it was soaked in saline (0.9 wt %) at room temperature. After 30 minutes, the envelope was centrifuged at 250 G for 3 minutes to drain, and the weight W'2 (g) of the envelope was measured. Further, after carrying out the same operation without using the polymer, the weight W'1 (g) of the envelope was measured. Then, CRC (g/g) was calculated by using the obtained weight values according to the following Equation 2.

$$CRC\,(\text{g/g}) = \{[W'2(\text{g}) - W'1(\text{g})]/W'0(\text{g})\} - 1 \qquad \text{[Equation 2]}$$

(2) Absorbency Under Pressure (AUP)

The absorbency under pressure at 0.7 psi of each polymer was measured according to the EDANA WSP 242.3. In the measurement of the absorbency under pressure, the classified polymers obtained in the measurement of CRC were used.

Specifically, a 400 mesh stainless steel screen was installed in a cylindrical bottom of a plastic having an inner diameter of 25 mm. $W_0$ (g, 0.16 g) of the super absorbent polymer was uniformly scattered on the screen at room temperature and a humidity of 50%. Thereafter, a piston which can uniformly provide a load of 0.7 psi was placed thereon. Herein, the outer diameter of the piston was slightly smaller than 25 mm, there was no gap with the inner wall of the cylinder, and jig-jog of the cylinder was not interrupted. At this time, the weight $W_3$ (g) of the device was measured.

Subsequently, a glass filter having a diameter of 90 mm and a thickness of 5 mm was placed in a petri dish having a diameter of 150 mm, and saline (0.9 wt % sodium chloride) was poured in the dish. At this time, the saline was poured until the surface level of the saline became equal to the upper surface of the glass filter. One sheet of filter paper with a diameter of 90 mm was placed thereon. After the measuring device was placed on the filter paper, the liquid was absorbed for 1 hour under a load. After 1 hour, the measuring device was lifted, and the weight $W_4$ (g) was measured.

Then, absorbency under pressure (g/g) was calculated by using the obtained weight values according to the following Equation 3.

$$AUP\,(\mathrm{g/g}) = [W_4(\mathrm{g}) - W_3(\mathrm{g})]/W_0(\mathrm{g}) \quad \text{[Equation 3]}$$

(3) Effective Absorption Capacity (EFFC)

The effective absorption capacity was calculated by the following Equation 1 with the centrifuge retention capacity (CRC) and the absorbency under pressure (AUP) measured above.

$$\text{Effective absorption capacity } (EFFC) = \{CRC + 0.7\text{ psi } AUP\}/2 \quad \text{[Equation 1]}$$

(4) Vortex Time (Absorption Rate)

The vortex time (absorption rate) of the super absorbent polymers of Examples and Comparative Examples was measured in the following manner.

① First, 50 mL of 0.9% saline was added to a 100 mL beaker with a flat bottom using a 100 mL Mass Cylinder.

② Next, after placing the beaker in the center of a magnetic stirrer, a magnetic bar (8 mm in diameter, 30 mm in length) was put in the beaker.

③ Thereafter, the stirrer was operated such that the magnetic bar stirred at 600 rpm, and the lowermost part of vortex generated by the stirring was made to reach the top of the magnetic bar.

④ After confirming that the temperature of the saline in the beaker reached 24.0 °C, 2±0.01 g of a super absorbent polymer composition sample was added and a stopwatch was operated at the same time. Then, the time taken until the vortex disappeared and a surface of liquid became completely horizontal was measured in seconds, and this was taken as the vortex time.

TABLE 1

| Category | CRC (g/g) | AUP (g/g) | EFFC | Vortex time (sec) |
|---|---|---|---|---|
| Example 1 | 28.7 | 24.8 | 26.8 | 58 |
| Example 2 | 28.4 | 24.7 | 26.6 | 52 |
| Example 3 | 28.2 | 24.7 | 26.5 | 50 |
| Example 4 | 28.7 | 24.7 | 26.7 | 56 |
| Comparative Example 1 | 28.9 | 25.1 | 27.0 | 63 |
| Comparative Example 2 | 28.7 | 24.8 | 26.8 | 62 |
| Comparative Example 3 | 27.5 | 25.2 | 26.4 | 63 |

Referring to Table 1, it was confirmed that Examples according to the preparation method of the present disclosure could achieve excellent absorption properties by controlling the timing of adding the reducing agent in the step of forming a hydrogel polymer through foam polymerization. In particular, it was confirmed that the effective absorption capacity and absorption rate were remarkably improved.

In addition, when a reducing agent was mixed with the polymerized hydrogel polymer as in Comparative Example 3, additional reactions were performed only on the surface of the polymer, making it difficult to achieve a desired absorption rate.

The invention claimed is:

1. A method for preparing a super absorbent polymer, the method comprising:

preparing a monomer composition by mixing an acrylic acid-based monomer having at least partially neutralized acidic groups, an internal cross-linking agent, a foaming agent, a thermal polymerization initiator, and a photopolymerization initiator;

forming a hydrogel polymer by irradiating light while adding a reducing agent into the monomer composition;

drying, pulverizing, and classifying the hydrogel polymer to form a base resin powder; and cross-linking a surface of the base resin powder by performing heat treatment on the base resin powder in the presence of a surface cross-linking agent.

2. The method of claim 1, wherein a degree of neutralization of the acrylic acid-based monomer is 65 mol % to 75 mol %.

3. The method of claim 1, wherein the foaming agent is included in an amount of 500 ppmw to 3,000 ppmw based on a total weight of the acrylic acid-based monomer.

4. The method of claim 1, wherein the foaming agent is at least one selected from the group consisting of sodium bicarbonate, sodium carbonate, potassium bicarbonate, potassium carbonate, calcium bicarbonate, calcium carbonate, magnesium bicarbonate, magnesium carbonate, ammonium bicarbonate and ammonium carbonate.

5. The method of claim 1, wherein the reducing agent is included in an amount of 100 ppmw to 3,000 ppmw based on a total weight of the acrylic acid-based monomer.

6. The method of claim 1, wherein the reducing agent is at least one selected from the group consisting of sodium sulfite, potassium sulfite, ammonium sulfite, sodium hydrogen sulfite, potassium hydrogen sulfite, ammonium hydrogen sulfite, sodium metabisulfite, potassium metabisulfite, formic acid, oxalic acid, hydrogen peroxide and ascorbic acid.

7. The method of claim 1, wherein the photopolymerization initiator is included in an amount of 50 ppmw to 10,000 ppmw based on a total weight of the acrylic acid-based monomer.

8. The method of claim 1, wherein the photopolymerization initiator is at least one selected from the group consisting of benzoin ether, dialkyl acetophenone, hydroxyl alkylketone, phenyl glyoxylate, benzyl dimethyl ketal, acyl phosphine and α-aminoketone.

9. The method of claim 1, wherein the thermal polymerization initiator is included in an amount of 50 ppmw to 5,000 ppmw based on a total weight of the acrylic acid-based monomer.

10. The method of claim 1, wherein the thermal polymerization initiator is at least one selected from the group consisting of a persulfate-based initiator, an azo-based initiator, hydrogen peroxide, and ascorbic acid.

11. The method of claim 1, wherein the super absorbent polymer has a vortex time at 24.0 °C of less than 60 seconds.

12. The method of claim 1, wherein the super absorbent polymer has an effective absorption capacity (EFFC) calculated by Equation 1 of 26.5 g/g or more:

$$\text{Effective absorption capacity } (EFFC) = \{CRC + 0.7 \text{ psi } AUP\}/2. \quad \text{[Equation 1]}$$

wherein the CRC is centrifuge retention capacity measured according to EDANA WSP 241.3, and the 0.7 psi AUP is absorbency under pressure at 0.7 psi measured according to the EDANA WSP 242.3.

* * * * *